(12) United States Patent
Lee et al.

(10) Patent No.: US 7,327,957 B2
(45) Date of Patent: Feb. 5, 2008

(54) WAVELENGTH-TUNABLE LIGHT SOURCE AND WAVELENGTH-DIVISION MULTIPLEXED TRANSMISSION SYSTEM USING THE SOURCE

(75) Inventors: Chang Hee Lee, Daejon (KR); Hyun Deok Kim, Daegu (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 704 days.

(21) Appl. No.: 10/394,076

(22) Filed: Mar. 21, 2003

(65) Prior Publication Data

US 2003/0206740 A1    Nov. 6, 2003

(30) Foreign Application Priority Data

May 3, 2002    (KR)    ............. 10-2002-0024493

(51) Int. Cl.
*H04J 14/02* (2006.01)
*H04B 10/04* (2006.01)

(52) U.S. Cl. ............... 398/82; 398/196; 398/198; 398/199

(58) Field of Classification Search ............ 398/82, 398/182, 192, 194, 196, 198, 199; 372/9, 372/25, 98, 33, 34, 29.01, 29.02, 29.021
See application file for complete search history.

(56) References Cited

U.S. PATENT DOCUMENTS

| | | | |
|---|---|---|---|
| 4,563,087 A | 1/1986 | Bourbin et al. | |
| 5,202,780 A | 4/1993 | Fussanger | |
| 5,221,983 A | 6/1993 | Wagner | |
| 5,251,001 A | 10/1993 | Dave et al. | |
| 5,276,543 A | 1/1994 | Olshansky | |
| 5,321,541 A | 6/1994 | Cohen | |
| 5,436,760 A | 7/1995 | Nakabayashi | |
| 5,440,417 A | 8/1995 | Chung et al. | |
| 5,550,666 A | 8/1996 | Zirngibl | |
| 5,625,478 A | 4/1997 | Doerr et al. | |
| 5,646,774 A * | 7/1997 | Takara et al. | ............ 359/340 |
| 5,661,585 A | 8/1997 | Feldman et al. | |

(Continued)

FOREIGN PATENT DOCUMENTS

EP    1 195867    4/2002

(Continued)

OTHER PUBLICATIONS

B. Pezeshki et al., "Element Multi-Wavelength DFB Arrays for Widely Tunable Laser Modules", OFC 2002, pp. 711-712.

(Continued)

*Primary Examiner*—Dalzid Singh
(74) *Attorney, Agent, or Firm*—Blakely, Sokoloff, Taylor & Zafman LLP

(57) ABSTRACT

The present invention relates to a wavelength-tunable light source whose output wavelength can be externally controlled and a wavelength-division multiplexed transmission system using the source.

A wavelength-tunable light source in accordance with the present invention is constituted to be able to vary the output wavelength of a Fabry-Perot laser diode, that is wavelength-locked to an injected light, by controlling the wavelength of the injected light.

A wavelength-tunable light source in accordance with the present invention provides comparatively large output power and excellent economic features.

The present invention also presents a wavelength-division multiplexed transmission system using the wavelength-tunable light source.

17 Claims, 11 Drawing Sheets

U.S. PATENT DOCUMENTS

| | | | |
|---|---|---|---|
| 5,694,234 | A | 12/1997 | Darice et al. |
| 5,793,512 | A | 8/1998 | Ryu |
| 5,835,517 | A | 11/1998 | Jayaraman et al. |
| 5,880,865 | A | 3/1999 | Lu et al. |
| 5,894,247 | A | 4/1999 | Yoshida et al. |
| 5,907,417 | A | 5/1999 | Darice et al. |
| RE36,471 | E | 12/1999 | Cohen |
| 6,034,799 | A | 3/2000 | Hansen et al. |
| 6,097,523 | A | 8/2000 | Boot |
| 6,137,611 | A | 10/2000 | Boivin et al. |
| 6,192,170 | B1 | 2/2001 | Komatsu |
| 6,304,350 | B1 | 10/2001 | Doerr et al. |
| 6,498,871 | B1 | 12/2002 | Kuboki |
| 6,597,482 | B1 | 7/2003 | Chung et al. |
| 6,650,840 | B2 | 11/2003 | Feldman |
| 6,674,969 | B1 * | 1/2004 | Ogusu .................. 398/79 |
| 6,888,856 | B2 | 5/2005 | Green et al. |
| 6,941,074 | B2 | 9/2005 | Nakamura et al. |
| 7,106,974 | B2 | 9/2006 | Lee et al. |
| 7,171,123 | B2 | 1/2007 | Lee et al. |
| 2001/0004290 | A1 | 6/2001 | Lee et al. |
| 2001/0013962 | A1 | 8/2001 | Li |
| 2002/0067526 | A1 | 6/2002 | Park et al. |
| 2002/0097768 | A1 * | 7/2002 | Thornton .................. 372/70 |
| 2003/0095736 | A1 | 5/2003 | Kish, Jr. et al. |
| 2003/0142978 | A1 | 7/2003 | Hee et al. |
| 2003/0223672 | A1 | 12/2003 | Joyner et al. |
| 2004/0033004 | A1 | 2/2004 | Welch et al. |
| 2004/0175188 | A1 | 9/2004 | Bellemare et al. |

FOREIGN PATENT DOCUMENTS

| | | |
|---|---|---|
| KR | 00-33946 | 6/2000 |
| KR | 00-39036 | 7/2000 |
| KR | 01-93921 | 10/2001 |
| KR | 0325687 | 2/2002 |
| KR | 0454887 | 10/2004 |
| KR | 0496710 | 6/2005 |
| WO | WO 93/37002 | 7/1999 |
| WO | WO 9959010 | 11/1999 |
| WO | WO 03032547 | 4/2003 |
| WO | WO 03/065621 A1 | 8/2003 |
| WO | WO 03/107057 A1 | 12/2003 |

OTHER PUBLICATIONS

Jae-Seung Lee, "Signal-to-Noise Ratio Measurement of a 2.5-Gb/s Spectrum-Sliced Incoherent Light Channel", IEEE Photonics Technology Letters, vol. 9, No. 1, Jan. 1997, pp. 94-96.

Kim, Hyun, et al., "A Low-Cost WDM Source with an ASE Injected Fabry-Perot Semiconductor Laser", IEEE Photonics Technology Letters vol. 12, No. 8, Aug. 2000, pp. 1067-1069.

Feldman, Robert D., et al., "An Evaluation of Architectures Incorporating Wavelength Division Multiplexing for Broad-Band Fiber Access", Journal of Lightwave Technology, vol. 16, No. 9, Sep. 1998, pp. 1546-1559.

H. Takahashi, et al., "Transmission characteristics of arrayed-waveguide NxN wavelenth multiplexer," IEEE Photonic Technology Letters, vol. 13, No. 3, pp. 447-455 (Mar. 1995).

International Telecommunication Union (ITU), ITU-T, G.983.1. Series G: Transmission Systems and Media Digital Systems and Networks, Digital transmission systems—Digital sections and digital line system—Optical line systems for local and access networks, Broadband optical access systems based on Passive Optical Networks (PON) (Oct. 1998).

* cited by examiner

US 7,327,957 B2

WAVELENGTH-TUNABLE LIGHT SOURCE AND WAVELENGTH-DIVISION MULTIPLEXED TRANSMISSION SYSTEM USING THE SOURCE

BACKGROUND OF THE INVENTION

1. Field of the Invention

The present invention relates to a light source providing a wavelength-selective output. In more detail, it relates to a wavelength-tunable light source whose output wavelength can be externally controlled and a wavelength-division multiplexed(WDM) transmission system using the source.

2. Description of the Related Art

The light source providing output at a specific wavelength is one of the key-elements of a wavelength-division multiplexed transmission system, in which each channel is discriminated by its wavelength.

In order to minimize the interference between adjacent channels, the light source of wavelength-division multiplexed transmission system should have a stable wavelength and a sufficient side mode suppression ratio(SMSR). It is also desirable to, have a high output power and a narrow line width.

A distributed feed-back laser diode(DFBLD) is a representative light source in the prior art that meets the requirements described above.

However, the DFBLD is very expensive and requires a complicated control process to fix its output wavelength at a specified point. A spectrum-sliced system, which uses a broad-band light source instead of wavelength-specified light source, has been demonstrated to reduce the cost and the complexity of system.

Incoherent broad-band light sources(ILSs) such as a light emitting diode(LED), a super-luminescent diode(SLD), and optical amplifiers emitting amplified spontaneous emissions (ASEs) are representative light sources being used for spectrum-sliced system. Spectrum-sliced systems using these light sources are very attractive since they are able to simply the wavelength control process compared with the distributed feed-back laser diode.

U.S. Pat. No. 5,440,417 (System for spectrum-sliced fiber amplifier light for multi-channel wavelength-division-multiplexed applications) discloses a method of spectrum-slicing by using optical amplifier light source. And U.S. Pat. No. 5,694,234 (Wavelength division multiplexing passive optical network including broadcast overlay) discloses a spectrum-sliced system by using a directly-modulated LED.

However, they also have several disadvantages. For example, LED or an SLD hardly provides sufficient output power and an optical amplifier light source requires an expensive external modulator even though its output power is comparatively large.

That is to say, the system presented in U.S. Pat. No. 5,440,417 requires an additional external modulator and the system presented in U.S. Pat. No. 5,694,234 hardly provides sufficient output power.

On the other hand, a wavelength-tunable light source improves the functionality of a wavelength-division multiplexed transmission system.

One can tune the output wavelength of a distributed feed-back laser diode(DFBLD) by temperature control, however, the tunable wavelength range is only about a few nanometers in 1330~1600 nm band, the low-loss wavelength regime of a general silica-based single mode fiber.

Therefore, wavelength-tunable light sources employing an external cavity have been mainly studied in the prior art, however, they are costly and require complex devices to tune the output wavelength.

SUMMARY OF THE INVENTION

The present invention is proposed to solve the problems of the prior art mentioned above. The present invention presents a wavelength-tunable light source using a Fabry-Perot laser diode and a wavelength-division multiplexed transmission system employing the light source.

A Fabry-Perot laser diode can provide higher output power than both LED and SLD and is relative simple to manufacture compared with a distributed feed-back laser diode(DFBLD). However, it had not been used for a wavelength-division multiplexed transmission system since it is a multi-mode light source.

However, KR Patent 1003256870000(A light source for wavelength-division multiplexed telecommunication system using a Fabry-Perot laser diode wavelength-locked by an injected incoherent light, registered at Feb. 8, 2002) presents a method to obtain a wavelength-selective output by using a Fabry-Perot laser diode. By externally injecting a narrow-band light into a Fabry-Perot laser diode, the side mode suppression ratio increased and a high output power at a specific wavelength is obtainable.

As described above, a wavelength-tunable light source in accordance with the present invention is constituted to be able to tune the output wavelength by controlling the wavelength of the externally injected light.

In addition, the characteristics of the wavelength-tunable light source such as side mode suppression ratio, noise property, and output power can be optimized by controlling the temperature of a Fabry-Perot laser diode.

DESCRIPTION OF THE NUMERALS(SYMBOLS) ON THE MAIN PARTS OF THE DRAWINGS

100: an optical transmission system
BLS: a broad-band light source
EDFA a two-stage Erbium-doped fiber amplifier
(D)MUX1: a 2N×1 (de)multiplexer
(D)MUX2: an N×1 (de)multiplexer
DR: a laser diode driving circuit
EM: an external modulator
EMDR: an external modulator driving circuit
FPLD: a Fabry-Perot laser diode
IL: an wavelength interleaver
OC: an optical circulator
OSA: an optical spectrum analyzer
OSC: an oscilloscope
RX: an optical receiver
TBPF: a tunable band-pass filter
TEC: a temperature controller
WDM: a wavelength-division multiplexer

DETAILED DESCRIPTION OF THE EMBODIMENTS

Hereinafter, referring to appended drawings, the structures and operation principles of embodiments of the present invention are described in detail.

Figure 1:
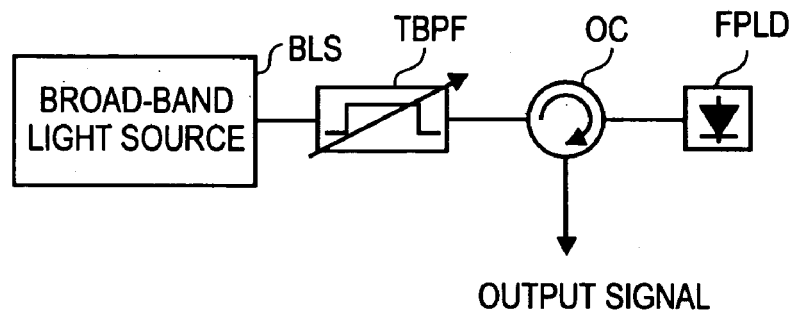
FIG. 1 is a schematic diagram of an embodiment of a wavelength-tunable light source in accordance with the present invention.

As described in FIG. 1, a wavelength-tunable light source in accordance with the present invention comprises a broad-band light source(BLS), a tunable band-pass filter(TBPF), an optical circulator and a Fabry-Perot laser diode.

Here, a broad-band light source is either one of a incoherent light sources such as a fiber optical amplifier emitting amplified spontaneous emissions, a semiconductor optical amplifier, a light emitting diode and a super-luminescent or a coherent light source super continuum source.

It is desirable that a Fabry-Perot laser diode(FPLD) should not contain an optical isolator for a efficient light injection.

A tunable band-pass filter(TBPF) selectively passes the light to be injected.

A Fabry-Perot laser diode(FPLD) is a multi-mode light source without an external light being injected thereto, however, if a light is injected thereto from outside, among the oscillation modes of the Fabry-Perot laser diode, a mode or modes within the range of the injected light will output relatively high power while the modes out of the range will be suppressed.

Consequently, a wavelength-selective output is outputted through an optical circulator(OC) connected to a Fabry-Perot laser diode(FPLD).

Here, since the output wavelength of the light source is determined by the light injected into a Fabry-Perot laser diode(FPLD), it can be tuned by controlling the band-pass of a tunable band-pass filter(TBPF).

The wavelengths of cavity modes of a Fabry-Perot laser diode(FPLD) vary according to the temperature of the Fabry-Perot laser diode.

With this characteristic, the characteristics of a wavelength-tunable light source such as side mode suppression ratio, noise property, output power, and output spectrum can be controlled by controlling the temperature of a Fabry-Perot laser diode(FPLD).

In addition, the characteristics of a wavelength-tunable light source such as side mode suppression ratio, noise property, output power, and output spectrum also can be controlled by controlling the bias current supplied to the Fabry-Perot laser diode (FPLD).

The output power of the wavelength-tunable light source varies as the bias current applied to a Fabry-Perot laser diode(FPLD).

Thus, a wavelength-tunable light source can be modulated not only by using an external modulator but also directly.

If an appropriate current is being applied to a Fabry-Perot laser diode(FPLD), the output of a wavelength-tunable light source is polarized, however, the reflected injection can be unpolarized.

With this characteristic, the extinction ratio of a modulated optical signal can be improved by additionally installing a polarization controller and a polarizer at the output port of an optical circulator(OC).

That is to say, by controlling a polarization controller for the output power of a wavelength-tunable light source to be maximized, the extinction ratio of the output of a wavelength-tunable light source can be maximized.

In a light source in accordance with the present invention, an optical circulator(OC) is used to reduce optical insertion losses.

However, even though an optical circulator(OC) is substituted with a low-cost optical power combiner, a light source having the similar characteristics can be achieved.

Figure 2:
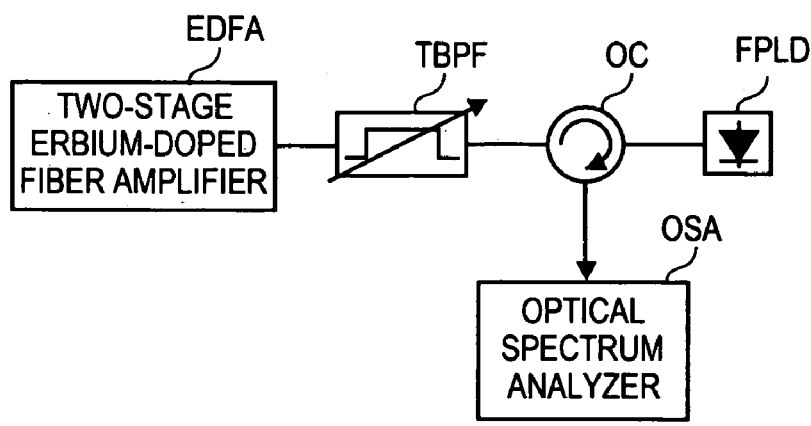
FIG. 2 is a schematic diagram of an experimental setup for measuring the characteristics of an embodiment of a wavelength-tunable light source in accordance with the present invention.

FIG. 2 shows an experimental setup for measuring the characteristics of an embodiment of a wavelength-tunable light source in accordance with the present invention.

A two-stage Erbium-doped fiber amplifier(EDFA) is used for an board-band light source(BLS) in FIG. 1, and a Fabry-Perot etalon filter is used for a tunable band-pass filter(TBPF).

The two-stage Erbium-doped fiber amplifier(EDFA) outputs amplified spontaneous emission(ASE), which is a incoherent light having a band-width larger than 30 nm.

A Fabry-Perot etalon filter(FPEF) with a 3-dB band-width of about 2.5 GHz selectively passes erbium-doped fiber amplifier(EDFA) output and the pass-band can be controlled by applying the voltage.

The power of the incoherent light injected into a Fabry-Perot laser diode(FPLD) through an optical circulator(OC) is −2 dBm, the threshold current of the Fabry-Perot laser diode(FPLD) is 10 mA, and a bias current of 17 mA is applied thereto.

The cavity length of the Fabry-Perot laser diode(FPLD) is about 400 um and the mode spacing is about 100 GHz, which corresponds to 40 times of the 3-dB band-width of the Fabry-Perot etalon filter(FPEF).

In the figure, OSA represents an optical spectrum analyzer.

Figure 3A:
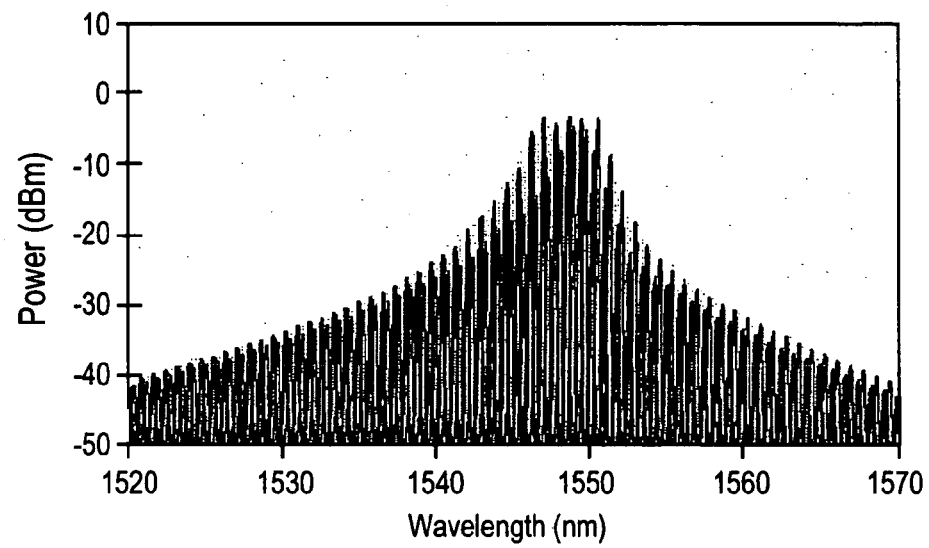
FIG. 3a~FIG. 3c are optical spectra measured by the experimental setup described in FIG. 2.
Figure 3B:
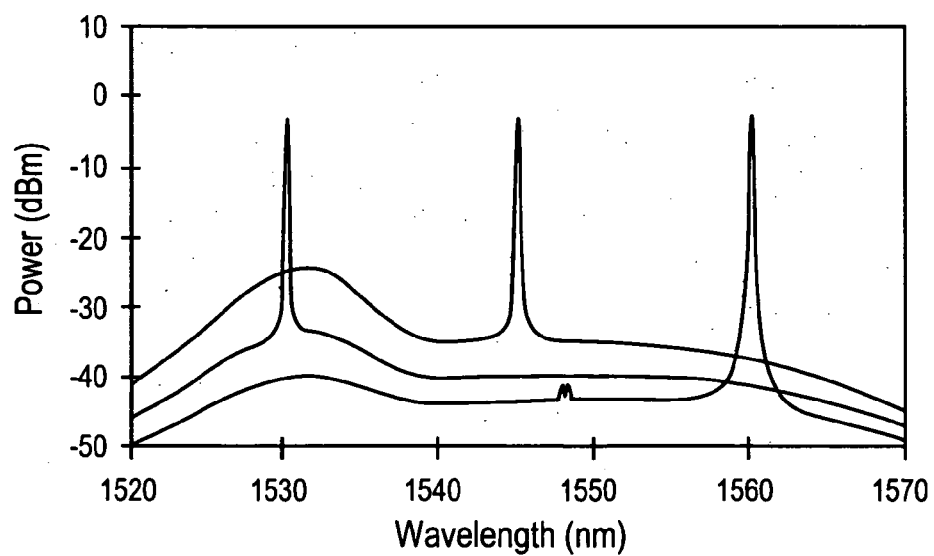
Figure 3C:
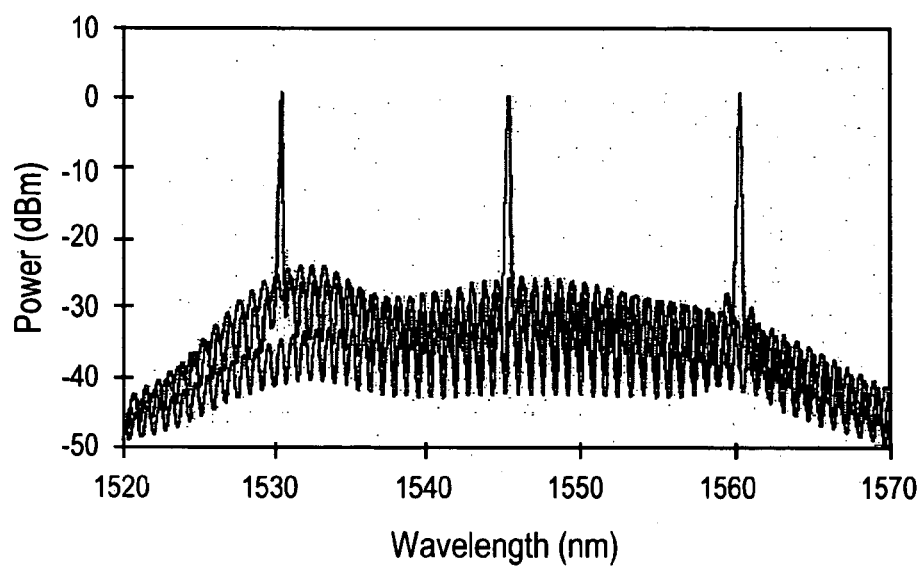

FIG. 3*a* shows output spectra of a Fabry-Perot laser diode(FPLD) measured without an ASE injection, FIG. 3*b* shows the spectra of lights injected into a Fabry-Perot laser diode, and FIG. 3*c* shows the output spectra of a wavelength-tunable light source after the lights in FIG. 3*b* being injected thereto respectively.

The peak wavelengths of the lights injected into a Fabry-Perot laser diode(FPLD) are 1530 nm, 1545 nm and 1560 nm, respectively, and the temperature of the Fabry-Perot laser diode(FPLD) was set for the side mode suppression ratio measured in FIG. 3c to be maximized in each case.

After a light injection, a Fabry-Perot laser diode provides a wavelength-selected output with a specific wavelength according to the wavelength of the injected light. The side mode suppression ratios measured are more than 30 dB and the output powers were about 0 dBm.

Therefore, it can be noticed that a light source in accordance with the present invention provides a narrow-band output with about more than 30 nm of wavelength-tunable range.

Figure 4A:
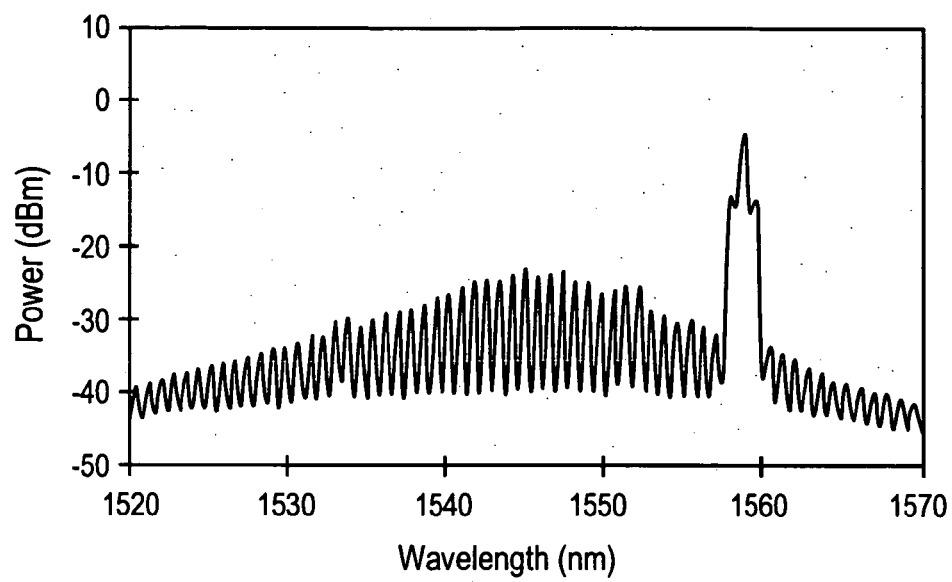
FIG. 4a~FIG. 4b are optical spectra measured by the experimental setup described in FIG. 2 with a different optical filter.

FIG. 4a is an optical spectrum measured by the experimental setup described in FIG. 2 with a different optical filter, whose 3-dB bandwidth is about 100 GHz.

The center wavelength of the filter is about 1558.8 nm.

Here, the 3-dB bandwidth of the filter is comparable to the mode spacing of a of the Fabry-Perot laser diode(FPLD). In general, the light source in accordance with the present invention is can be realized while a light with a 3-dB bandwidth of several times of the mode spacing of Fabry-Perot laser diode is injected into the Fabry-Perot laser diode.

Figure 4B:
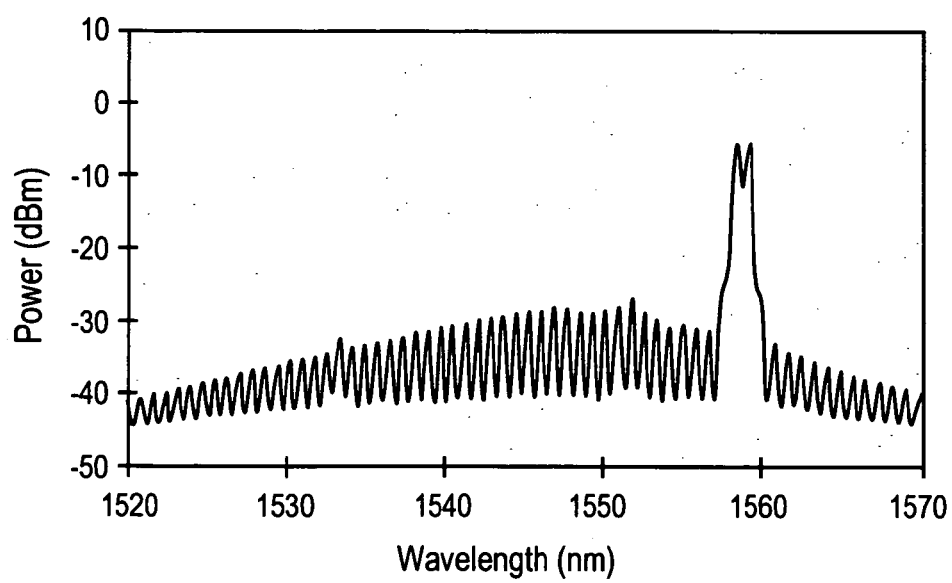

FIG. 4b is an optical spectrum measured by the same experimental setup, however, the temperature of the Fabry-Perot laser diode is tuned in order that the center wavelength of the injected light corresponds to the a mid-point of two cavity modes.

In this case, the light source provides a wavelength-selective output.

A Fabry-Perot laser diode(FPLD) used for a wavelength-tunable light source in accordance with the present invention can suppress the intensity noise of an injected incoherent light.

That is to say, as presented in the paper by Jae-Seung Lee("Signal-to-noise ratio measurement of a 2.5-Gb/s spectrum-sliced incoherent light channel", *IEEE Photon. Technol. Lett.*, vol. 1, no. 1, pp. 94-96, 1997), a spectrum-sliced incoherent light has a large intensity noise.

This kind of intensity noise degrades the performance of a spectrum-sliced system.

In a wavelength-tunable light source in accordance with the present invention, a Fabry-Perot laser diode suppresses intensity noise of the injected incoherent light.

An experimental setup can be constituted for confirming this characteristic as described in FIG. 5.

Figure 5A:
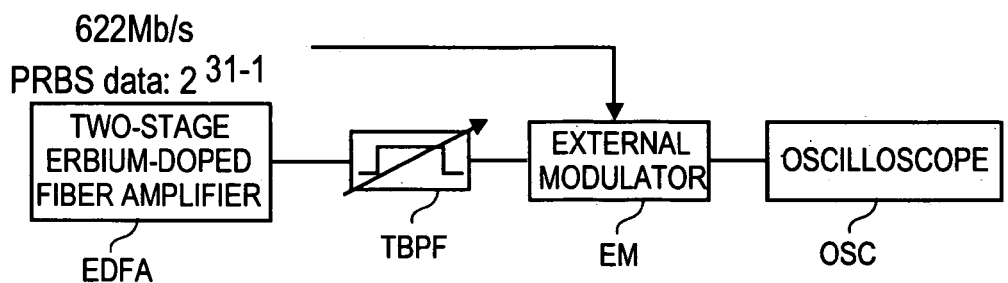
FIG. 5a is an experimental setup for measuring an eye diagram in a prior spectrum-sliced system and FIG. 5b is an experimental setup for measuring an eye diagram of a light source in accordance with the present invention.

The experimental setup described in FIG. 5a is for a prior spectrum-sliced system, which uses an external modulator (EM) followed by a tunable band-pass filter(TBPF) modulates narrow-band incoherent filter and thereafter measures its eye diagram using an oscilloscope(OSC).

Figure 5B:
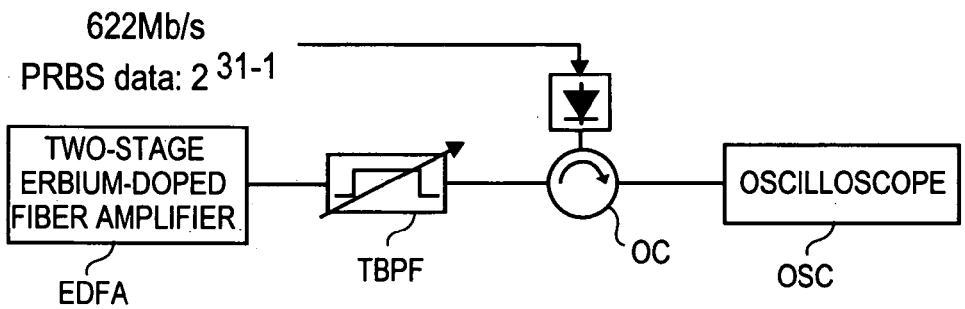

The experimental setup described in FIG. 5b is for a wavelength-tunable light source in accordance with the present invention, which injects an incoherent into a Fabry-Perot laser diode(FPLD), directly modulates the Fabry-Perot laser diode, and thereafter measures its eye diagram using an oscilloscope(OSC).

A Fabry-Perot etalon filter(FPEF) with a 3-dB bandwidth of about 2.5 GHz was used as a tunable band-pass filter (TBPF).

In both cases, the modulation bit rate were 622 Mb/s and the length of pseudo-random block signal(PRBS) applied to the external modulator or the Fabry-Perot laser diode(FPLD) was $2^{31}-1$.

Figure 6A:
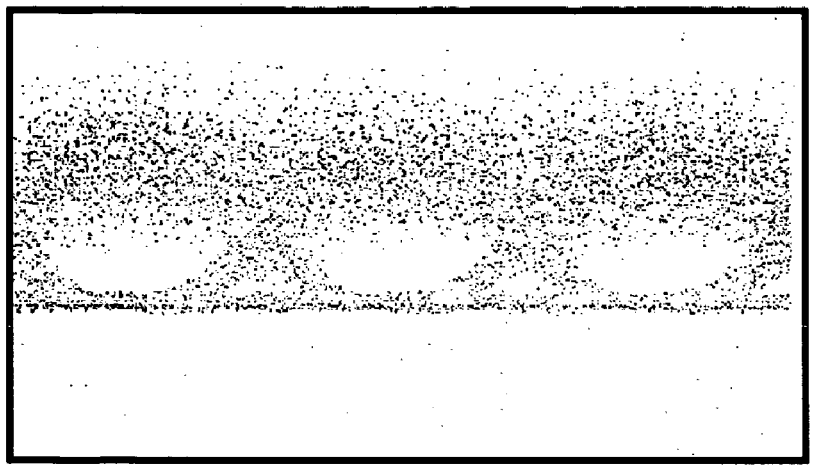
FIG. 6a and FIG. 6b are eye diagrams measured by the experimental setup described in FIG. 5a and FIG. 5b respectively.
Figure 6B:
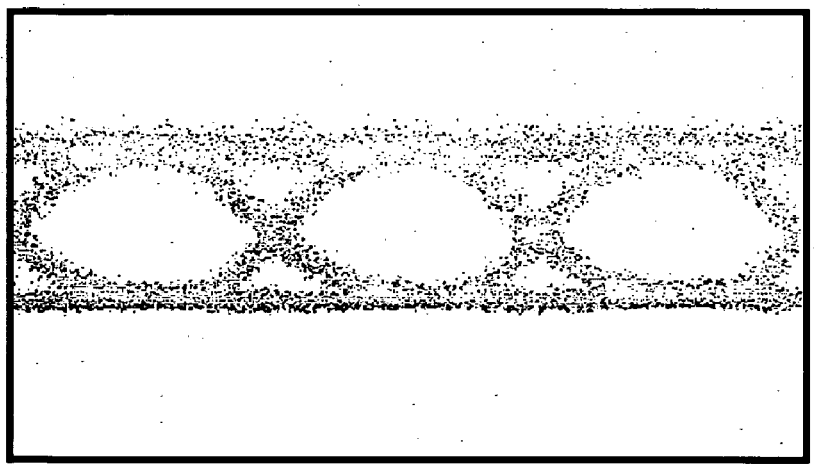

FIG. 6a and FIG. 6b are showing the eye diagrams measured in both cases respectively. Referring to the figures, it can be noticed that a wavelength-tunable light source in accordance with the present invention is suppressing the intensity noise of the incoherent light.

As mentioned thereinbefore, a wavelength-tunable light source in accordance with the present invention can be used for various applications in a wavelength-division multiplexed transmission system.

Figure 7:
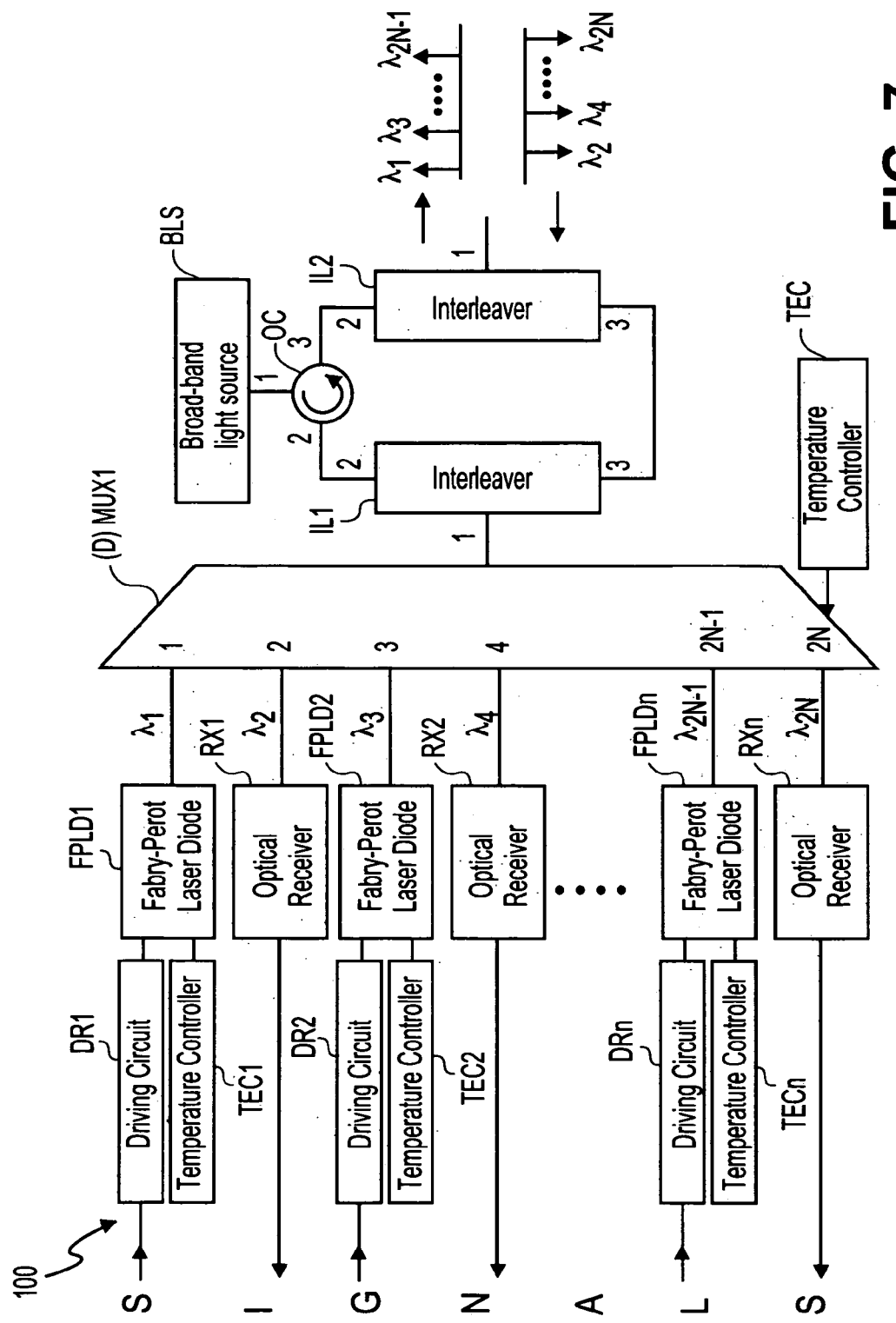
FIG. 7 is the first embodiment of a wavelength-division multiplexed transmission system in accordance with the present invention.

FIG. 7 shows the first embodiment of a wavelength-division multiplexed transmission system using a light source in accordance with the present invention, which outputs N first-group wavelength-division-multiplexed optical signals($\lambda_1, \lambda_3, \ldots, \lambda_{2N-1}$) through an optical fiber and receives N second-group wavelength-division-multiplexed optical signals($\lambda_2, \lambda_4, \ldots, \lambda_{2N}$) inputted through the fiber.

As described in FIG. 7, a wavelength-division multiplexed transmission system in accordance with the present invention comprises N Fabry-Perot laser diodes(FPLD1, FPLD2, ..., FPLDn), N laser diode driving circuits(DR1, DR2, ..., DRn), N laser diode temperature controllers (TEC1, TEC2, ..., TECn), N optical receivers(RX1, RX2, ..., RXn), a 2N×1 (de)multiplexer((D)MUX1), a (de)multiplexer temperature controller(TEC), two wavelength interleavers(IL1, IL2), an optical circulator(OC) and an broad-band light source(BLS).

A (de)multiplexer((D)MUX1) demultiplexes wavelength-division multiplexed optical signals inputted through a common and outputs them through 2N input/output ports respectively. Or, it multiplexes the optical signals having different wavelengths, which are inputted through 2N input/output ports respectively, and outputs them through the common port.

The wavelengths of the first-group optical signals($\lambda_1, \lambda_3, \ldots, \lambda_{2N-1}$) and the second-group optical signals($\lambda_2, \lambda_4, \ldots, \lambda_{2N}$) are arranged to be interlaid. The first-group optical signals($\lambda_1, \lambda_3, \ldots, \lambda_{2N-1}$) can be transferred between a common port and odd-numbered ports(1, 3, ..., 2N–1) of a (de)multiplexer((D)MUX1) and the second-group optical signals($\lambda_2, \lambda_4, \ldots, \lambda_{2N}$) can be transferred between a common port and even-numbered ports(2, 4, ..., 2N) of a (de)multiplexer.

An broad-band light source(BLS) emits a wide-band light.

The optical circulator(OC) outputs the optical signals inputted through the first port through the second port and the optical signals inputted through the second port through the third port.

The wavelength interleavers(IL1, IL2) transfer the first-group optical signals($\lambda_1, \lambda_3, \ldots, \lambda_{2N-1}$) and block the second-group optical signals($\lambda_2, \lambda_4, \ldots, \lambda_{2N}$) between the first port and the second port, and on the other hand, they transfer the second-group optical signals($\lambda_2, \lambda_4, \ldots, \lambda_{2N}$) and block the first-group optical signals($\lambda_1, \lambda_3, \ldots, \lambda_{2N-1}$) between the first port and the third port.

The connection of a transmission system(100) described above can be performed as follows:

N Fabry-Perot laser diodes(FPLD1, FPLD2, ..., FPLDn) are connected to the odd-numbered ports of a (de)multiplexer((D)MUX1), and N optical receivers(RX1, RX2, ..., RXn) are connected to the even-numbered ports of the (de)multiplexer((D)MUX1) respectively.

The common port of a (de)multiplexer((D)MUX1) is connected to the first port of a first wavelength interleaver (IL1), the second port of the first wavelength interleaver (IL1) is connected to the second port of an optical circulator (OC), the first port of the optical circulator(OC) is connected to an broad-band light source(BLS) and the third port of the optical circulator(OC) is connected to the second port of a second wavelength interleaver(IL2).

The third port of the first wavelength interleaver(IL1) and the third port of the second wavelength interleaver(IL2) are connected to each other, and the first port of the second wavelength interleaver(IL2) becomes an output port of a transmission system(100).

Looking into the operation principle of a transmission system(100), an broad-band light source(BLS) emits a wide-band light, the emitted light is then inputted through the first port of an optical circulator(OC), passing through the second port, and then inputted into the second port of a first wavelength interleaver(IL1).

Then, the first wavelength interleaver(IL1) outputs some portion of the inputted wide-band light through the first port.

The output from the first wavelength interleaver(IL1) is inputted into the common port of a (de)multiplexer((D)MUX1), and outputted through corresponding odd-numbered ports of the (de)multiplexer((D)MUX1) respectively.

The outputs from the (de)multiplexer((D)MUX1) are inputted into N Fabry-Perot laser diodes(FPLD1, FPLD2, ..., FPLDn) respectively, and then N Fabry-Perot laser diodes(FPLD1, FPLD2, ..., FPLDn) output first-group optical signals($\lambda_1, \lambda_3, \ldots, \lambda_{2N-1}$) whose wavelengths are within the pass-bands of the odd-numbered ports of the (de)multiplexer((D)MUX1) respectively.

The first-group optical signals($\lambda_1, \lambda_3, \ldots, \lambda_{2N-1}$) are multiplexed by the (de)multiplexer((D)MUX1), and then inputted into the first port of the first wavelength interleaver (IL1).

The first-group optical signals($\lambda_1, \lambda_3, \ldots, \lambda_{2N-1}$) inputted into the first wavelength interleaver(IL1) are outputted through the second port, passing through the second port and the third port of the optical circulator(OC), and then inputted into the second port of a second wavelength interleaver(IL2) to be outputted through the first port of the second wavelength interleaver(IL2).

The second-group optical signals($\lambda_2, \lambda_4, \ldots, \lambda_{2N}$) inputted into the first port of the second wavelength interleaver(IL2) are outputted through the third port, and then inputted into the third port of the first wavelength interleaver (IL1) to be outputted through the first port, and thereafter inputted into the common port of the (de)multiplexer((D)MUX1).

The second-group optical signals($\lambda_2, \lambda_4, \ldots, \lambda_{2N}$) inputted through the common port are outputted through the corresponding even-numbered ports of the (de)multiplexer ((D)MUX1), and then received by optical receivers(RX1, RX2, ..., RXn) respectively.

Here, the transmission system(100) may further comprise N laser diode driving circuits(DR1, DR2, ..., DRn) to modulate N Fabry-Perot laser diodes N Fabry-Perot laser diodes(FPLD1, FPLD2, ..., FPLDn), N laser diode temperature controllers(TEC1, TEC2, ..., TECn) for controlling the temperatures of N Fabry-Perot laser diodes (FPLD1, FPLD2, ..., FPLDn) and a temperature controller (TEC) for controlling the temperature of the (de)multiplexer ((D)MUX1).

Figure 8:
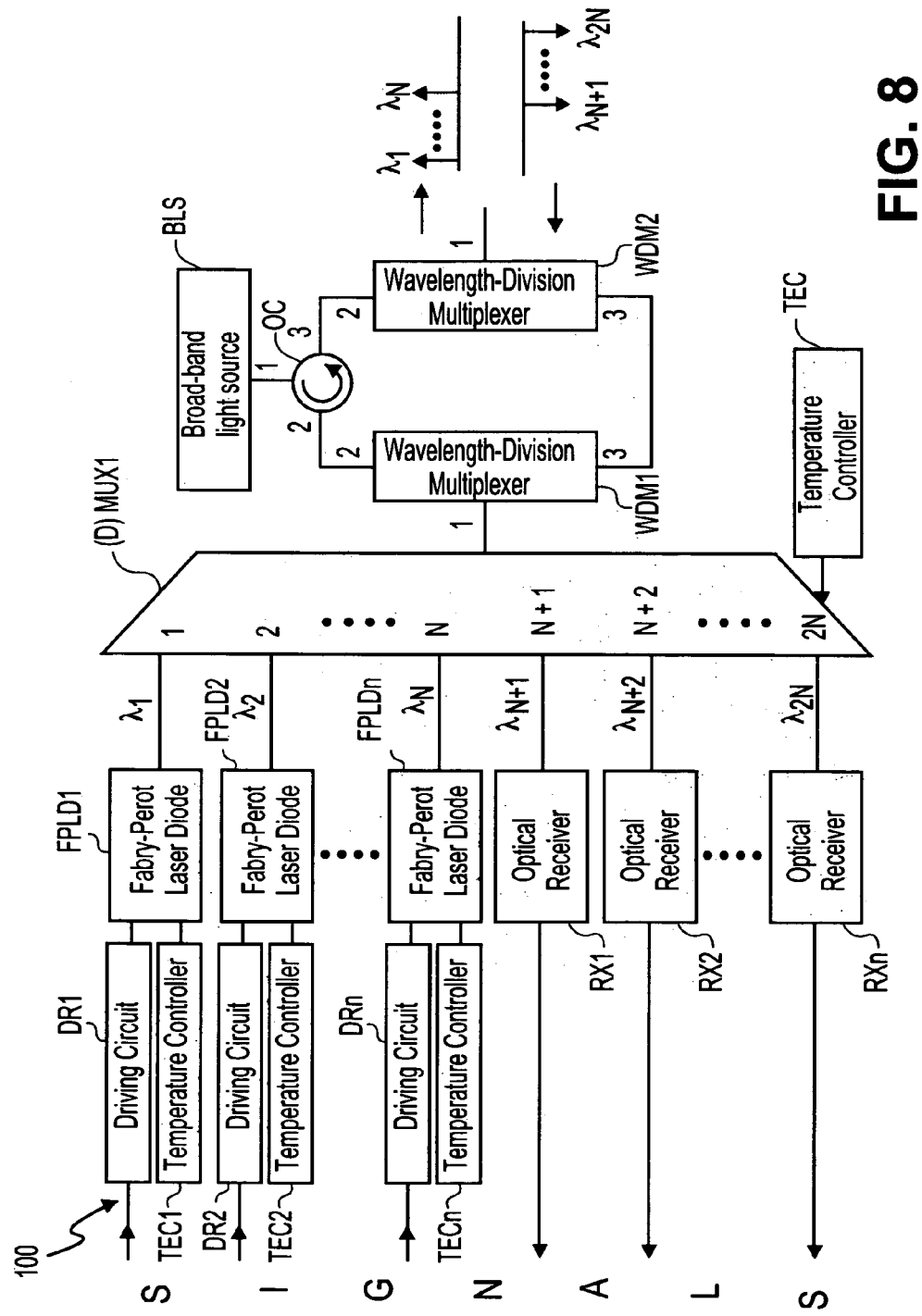
FIG. 8 is the second embodiment of a wavelength-division multiplexed transmission system in accordance with the present invention.

FIG. 8 shows the second embodiment of a wavelength-division multiplexed transmission system using a light source in accordance with the present invention, which outputs N third-group wavelength-division-multiplexed optical signals($\lambda_1, \lambda_2, \ldots, \lambda_N$) through an optical fiber and receives N fourth-group wavelength-division-multiplexed optical signals($\lambda_{N+1}, \lambda_{N+2}, \ldots, \lambda_{2N}$) inputted through the fiber.

As described in FIG. 8, a wavelength-division multiplexed transmission system in accordance with the present invention comprises N Fabry-Perot laser diodes(FPLD1, FPLD2, ..., FPLDn), N laser diode driving circuits(DR1, DR2, ..., DRn), N laser diode temperature controllers (TEC1, TEC2, ..., TECn), N optical receivers(RX1, RX2, ..., RXn), a 2N×1 (de)multiplexer((D)MUX1), a (de)multiplexer temperature controller(TEC), two wavelength-division multiplexers(WDM1, WDM2), an optical circulator(OC) and an broad-band light source(BLS).

A (de)multiplexer((D)MUX1) demultiplexes wavelength-division multiplexed optical signals inputted through a common port and outputs them through 2N input/output ports respectively. Or, it multiplexes the optical signals having different wavelengths, which are inputted through 2N input/output ports respectively, and outputs them through the common port.

The wavelengths of the third-group optical signals($\lambda_1, \lambda_2, \ldots, \lambda_N$) and the fourth-group optical signals($\lambda_{N+1}, \lambda_{N+2}, \ldots, \lambda_{2N}$) are arranged in different wavelength-bands respectively. The third-group optical signals($\lambda_1, \lambda_2, \ldots, \lambda_N$) can be transferred between a common port and the (first~N-th) ports of a (de)multiplexer((D)MUX1) and the fourth-group optical signals($\lambda_{N+1}, \lambda_{N+2}, \ldots, \lambda_{2N}$) can be transferred between a common port and the (N+1-th~2N-th) ports of a (de)multiplexer.

An broad-band light source(BLS) emits a wide-band light.

The optical circulator(OC) outputs the optical signals inputted through the first port through the second port and the optical signals inputted through the second port through the third port.

The wavelength-division multiplexers(WDM1, WDM2) transfer the third-group optical signals($\lambda_1, \lambda_2, \ldots, \lambda_N$) and block the fourth-group optical signals($\lambda_{N+1}, \lambda_{N+2}, \ldots, \lambda_{2N}$) between the first port and the second port, and on-the other hand, they transfer the fourth-group optical signals($\lambda_{N+1}, \lambda_{N+2}, \ldots, \lambda_{2N}$) and block the third-group optical signals($\lambda_1, \lambda_2, \ldots, \lambda_N$) between the first port and the third port.

The connection of a transmission system(100) described above can be performed as follows:

N Fabry-Perot laser diodes(FPLD1, FPLD2, ..., FPLDn) are connected to the (first~N-th) ports of a (de)multiplexer ((D)MUX1), and N optical receivers(RX1, RX2, ..., RXn) are connected to the (N+1-th~2N-th) ports of the (de) multiplexer((D)MUX1) respectively.

The common port of a (de)multiplexer((D)MUX1) is connected to the first port of a first wavelength-division multiplexer(WDM1), the second port of the first wavelength-division multiplexer(WDM1) is connected to the second port of an optical circulator(OC), the first port of the optical circulator(OC) is connected to an broad-band light source(BLS) and the third port of the optical circulator(OC) is connected to the second port of a second wavelength-division multiplexer(WDM2).

The third port of the first wavelength-division multiplexer (WDM1) and the third port of the second wavelength-division multiplexer(WDM2) are connected to each other, and the first port of the second wavelength-division multiplexer(WDM2) becomes an output port of a transmission system(100).

Looking into the operation principle of a transmission system(100), the output of an broad-band light source(BLS) is inputted through the first port of an optical circulator(OC), passing through the second port, and then inputted into the second port of a first wavelength-division multiplexer (WDM1).

Then, the first wavelength-division multiplexer(WDM1) outputs some portion of the inputted wide-band light through the first port.

The output from the first wavelength-division multiplexer (WDM1) is inputted into the common port of a (de)multiplexer((D)MUX1), and outputted through the corresponding (first~N-th) ports of the (de)multiplexer((D)MUX1) respectively.

The outputs from the (de)multiplexer((D)MUX1) are inputted into N Fabry-Perot laser diodes(FPLD1, FPLD2, ..., FPLDn) respectively, and then N Fabry-Perot laser diodes(FPLD1, FPLD2, ..., FPLDn) output third group optical signals($\lambda_1, \lambda_2, \ldots, \lambda_N$) whose wavelengths are within the pass-bands of the (first~N-th) ports of the (de)multiplexer((D)MUX1) respectively.

The third-group optical signals($\lambda_1, \lambda_2, \ldots, \lambda_N$) are multiplexed by the (de)multiplexer((D)MUX1), and then inputted into the first port of the first wavelength-division multiplexer(WDM1).

The third-group optical signals($\lambda_1, \lambda_2, \ldots, \lambda_N$) inputted into the first wavelength-division multiplexer(WDM1) are outputted through the second port, passing through the second port and the third port of the optical circulator(OC), and then inputted into the second port of a second wavelength-division multiplexer(WDM2) to be outputted through the first port of the second wavelength-division multiplexer (WDM2).

The fourth-group optical signals($\lambda_{N+1}, \lambda_{N+2}, \ldots, \lambda_{2N}$) inputted into the first port of the second wavelength-division multiplexer(WDM2) are outputted through the third port, and then inputted into the third port of the first wavelength-division multiplexer(WDM1) to be outputted through the first port, and thereafter inputted into the common port of the (de)multiplexer((D)MUX1).

Then, the signals inputted through the common port are outputted through the corresponding (N+1-th~2N-th) ports of the (de)multiplexer((D)MUX1) and received by optical receivers(RX1, RX2, ..., RXn) connected to the ports respectively.

Here, the transmission system(100) may further comprise N laser diode driving circuits(DR1, DR2, ..., DRn) to modulate N Fabry-Perot laser diodes(FPLD1, FPLD2, ..., FPLDn), N laser diode temperature controllers(TEC1, TEC2, ..., TECn) for controlling the temperatures of N Fabry-Perot laser diodes(FPLD1, FPLD2, ..., FPLDn) and a temperature controller(TEC) for controlling the temperature of the (de)multiplexer((D)MUX1).

Figure 9:
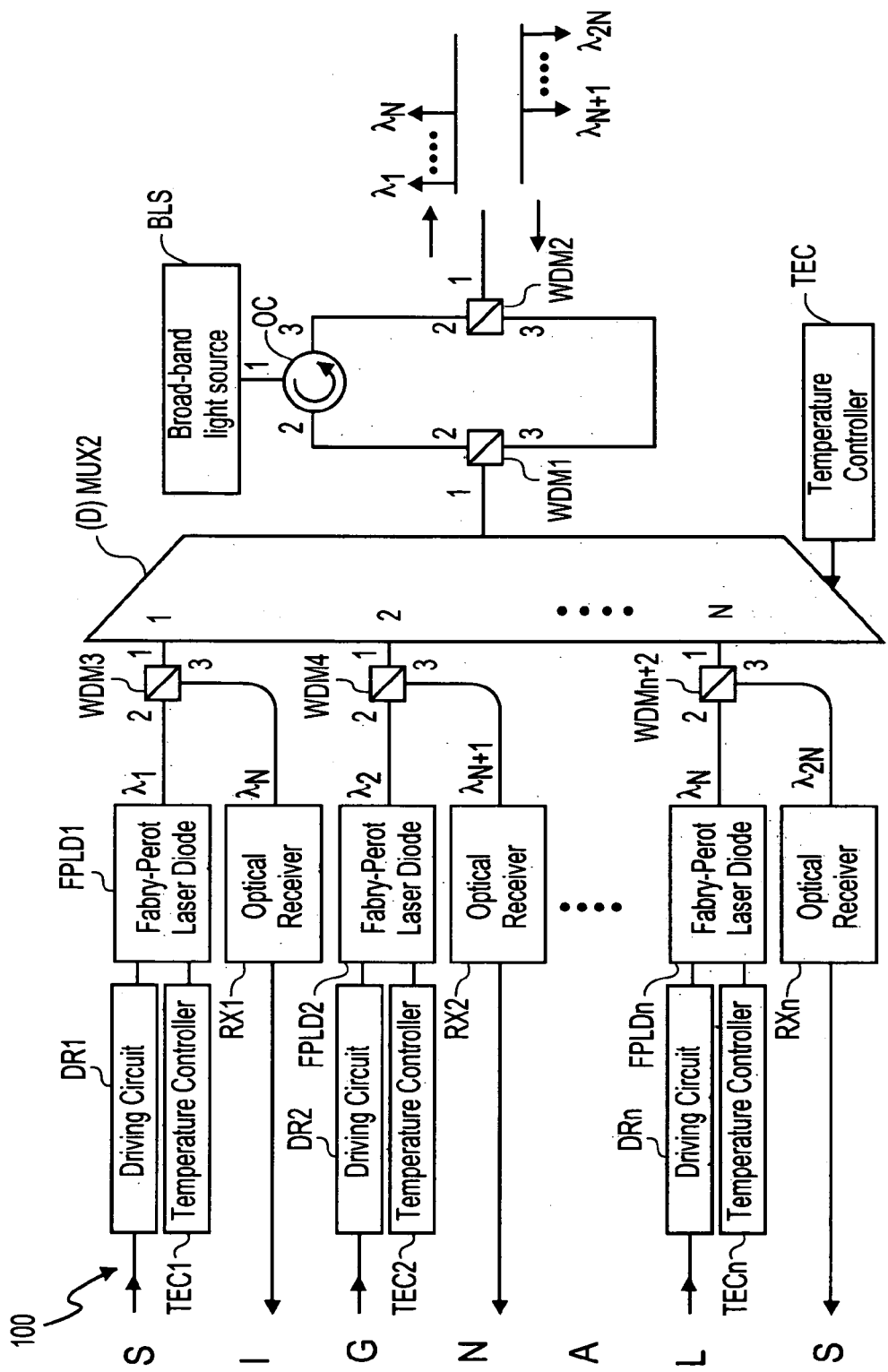
FIG. 9 is the third embodiment of a wavelength-division multiplexed transmission system in accordance with the present invention.

FIG. 9 shows a third embodiment of a wavelength-division multiplexed transmission system using a light source in accordance with the present invention, which outputs N fifth-group wavelength-division-multiplexed optical signals($\lambda_1, \lambda_2, \ldots, \lambda_N$) through an optical fiber and receives N sixth-group wavelength-division-multiplexed optical signals($\lambda_{N+1}, \lambda_{N+2}, \ldots, \lambda_{2N}$) inputted through the fiber.

As described in FIG. 9, a wavelength-division multiplexed transmission system in accordance with the present invention comprises N Fabry-Perot laser diodes(FPLD1, FPLD2, ..., FPLDn), N laser diode driving circuits(DR1, DR2, ..., DRn), N laser diode temperature controllers (TEC1, TEC2, ..., TECn), N optical receivers(RX1, RX2, ..., RXn), an N×1 (de)multiplexer((D)MUX2), a (de)multiplexer temperature controller(TEC), (N+2) wavelength-division multiplexers(WDM1, ..., WDM$_{n+1}$, WDM$_{n+2}$), an optical circulator(OC) and an broad-band light source(BLS).

A (de)multiplexer((D)MUX2) demultiplexes wavelength-division multiplexed optical signals inputted through a common port and outputs them through N input/output ports respectively. Or, it multiplexes the optical signals having different wavelengths, which are inputted through N input/output ports respectively, and outputs them through the common port. Here, the signal transfer characteristics between the common port and each input/output port are repeated with a wavelength interval of I(an arbitrary integer) times the free spectral range of the (de)multiplexer((D)MUX2).

The wavelengths of the fifth-group optical signals($\lambda_1, \lambda_2, \ldots, \lambda_N$) and the sixth-group optical signals($\lambda_{N+1}, \lambda_{N+2}, \ldots, \lambda_{2N}$) are arranged in different wavelength-bands respectively. Both the fifth-group optical signals($\lambda_1, \lambda_2, \ldots, \lambda_N$) and the sixth-group optical signals($\lambda_{N+1}, \lambda_{N+2}, \ldots, \lambda_{2N}$) can be transferred between a common port and N input/output ports of a (de)multiplexer((D)MUX2), however, the wavelengths of the fifth-group optical signals ($\lambda_1, \lambda_2, \ldots, \lambda_N$) and the sixth-group optical signals($\lambda_{N+1}, \lambda_{N+2}, \ldots, \lambda_{2N}$) are arranged to be apart from each other with the interval of I(an arbitrary integer) times the free spectral range of the (de)multiplexer((D)MUX2) respectively.

An broad-band light source(BLS) emits a wide-band light.

The optical circulator(OC) outputs the optical signals inputted through the first port through the second port and the optical signals inputted through the second port through the third port.

The wavelength-division multiplexers(WDM1, ..., WDM$_{n+1}$, WDM$_{n+2}$) transfer the fifth-group optical signals ($\lambda_1, \lambda_2, \ldots, \lambda_N$) and block the sixth-group optical signals ($\lambda_{N+1}, \lambda_{N+2}, \ldots, \lambda_{2N}$) between the first port and the second port, and on the other hand, they transfer the sixth-group optical signals($\lambda_{N+1}, \lambda_{N+2}, \ldots, \lambda_{2N}$) and block the fifth-group optical signals($\lambda_1, \lambda_2, \ldots, \lambda_N$) between the first port and the third port.

The connection of a transmission system(100) described above can be performed as follows:

N input/output ports of a (de)multiplexer((D)MUX2) are connected to the first ports of N wavelength-division multiplexers(WDM3, ..., WDM$_{n+1}$, WDM$_{n+2}$), N Fabry-Perot laser diodes(FPLD1, FPLD2, ..., FPLDn) are connected to the second ports of N wavelength-division multiplexers (WDM3, ..., WDM$_{n+1}$, WDM$_{n+2}$), and N optical receivers (RX1, RX2, ..., RXn) are connected to the third ports of N wavelength-division multiplexers(WDM3, ..., WDM$_{n+1}$, WDM$_{n+2}$) respectively.

The common port of a (de)multiplexer((D)MUX2) is connected to the first port of a first wavelength-division multiplexer(WDM1), the second port of the first wavelength-division multiplexer(WDM1) is connected to the second port of the optical circulator(OC), the first port of an optical circulator(OC) is connected to an broad-band light source(BLS) and the third port of the optical circulator(OC) is connected to the second port of a second wavelength-division multiplexer(WDM2).

The third port of the first wavelength-division multiplexer (WDM1) and the third port of the second wavelength-division multiplexer(WDM2) are connected to each other, and the first port of the second wavelength-division multiplexer(WDM2) becomes an output port of a transmission system(100).

Looking into the operation principle of a transmission system(100), the output of an broad-band light source(BLS) is inputted through the first port of an optical circulator(OC), passing through the second port, and then inputted into the second port of a first wavelength-division multiplexer (WDM1).

Then, the first wavelength-division multiplexer(WDM1) outputs some portion of the inputted light through the first port.

The output from the first wavelength-division multiplexer (WDM1) is inputted into the common port of a (de)multiplexer((D)MUX2), and then outputted through the corresponding input/output ports of the (de)multiplexer((D) MUX2) respectively.

The outputs from the (de)multiplexer((D)MUX2) are inputted into the first ports of N wavelength-division multiplexers(WDM3, ..., $WDM_{n+1}$, $WDM_{n+2}$), and then outputted through the second ports to be inputted into N Fabry-Perot laser diodes(FPLD1, FPLD2, ..., FPLDn) respectively.

N Fabry-Perot laser diodes(FPLD1, FPLD2, ..., FPLDn) output fifth-group optical signals($\lambda_1$, $\lambda_2$, ..., $\lambda_N$) whose wavelengths are within the pass-bands of the N input/output ports of the (de)multiplexer((D)MUX2) respectively.

The fifth-group optical signals($\lambda_1$, $\lambda_2$, ..., $\lambda_N$) are transferred through N wavelength-division multiplexers (WDM3, ..., $WDM_{n+1}$, $WDM_{n+2}$) to be inputted into the (de)multiplexer((D)MUX2) and multiplexed therein. Then the multiplexed signals are inputted into the first port of the first wavelength-division multiplexer(WDM1).

The fifth-group optical signals($\lambda_1$, $\lambda_2$, ..., $\lambda_N$) inputted into the first wavelength-division multiplexer(WDM1) are outputted through the second port, passing through the second port and the third port of the optical circulator(OC), and then inputted into the second port of the second wavelength-division multiplexer(WDM2) to be outputted through the first port of the second wavelength-division multiplexer (WDM2).

The sixth-group optical signals($\lambda_{N+1}$, $\lambda_{N+2}$, ..., $\lambda_{2N}$) inputted into the first port of the second wavelength-division multiplexer(WDM2) are outputted through the third port, and then inputted into the third port of the first wavelength-division multiplexer(WDM1) to be outputted through the first port, and thereafter inputted into the common port of the (de)multiplexer((D)MUX2).

The sixth-group optical signals($\lambda_{N+1}$, $\lambda_{N+2}$, ..., $\lambda_{2N}$) inputted through the common port are outputted through the corresponding input/output ports of the (de)multiplexer((D) MUX2) to be inputted into the first ports of N wavelength-division multiplexers(WDM3, ..., $WDM_{n+1}$, $WDM_{n+2}$) respectively.

The sixth-group optical signals($\lambda_{N+1}$, $\lambda_{N+2}$, ..., $\lambda_{2N}$) inputted into N wavelength-division multiplexers (WDM3, ..., $WDM_{n+1}$, $WDM_{n+2}$) are then outputted through the third ports of the wavelength-division multiplexers to be received by optical receivers(RX1, RX2, ..., RXn).

Here, the transmission system(100) may further comprise N laser diode driving circuits(DR1, DR2, ..., DRn) to modulate N Fabry-Perot laser diodes(FPLD1, FPLD2, ..., FPLDn), N laser diode temperature controllers(TEC1, TEC2, ..., TECn) for controlling the temperatures of N Fabry-Perot laser diodes(FPLD1, FPLD2, ..., FPLDn) and a temperature controller(TEC) for controlling the temperature of the (de)multiplexer((D)MUX2).

Figure 10:
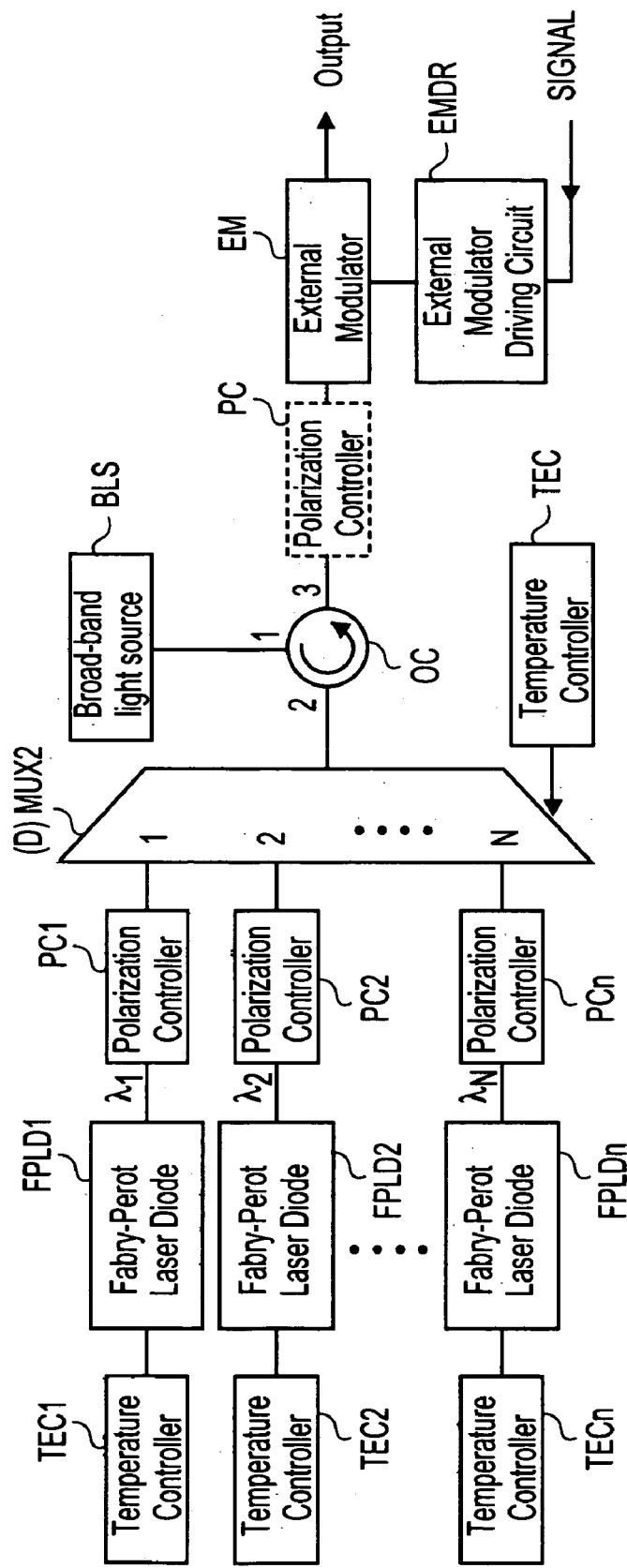
FIG. 10 is the fourth embodiment of a wavelength-division multiplexed transmission system in accordance with the present invention.
Figure 11:
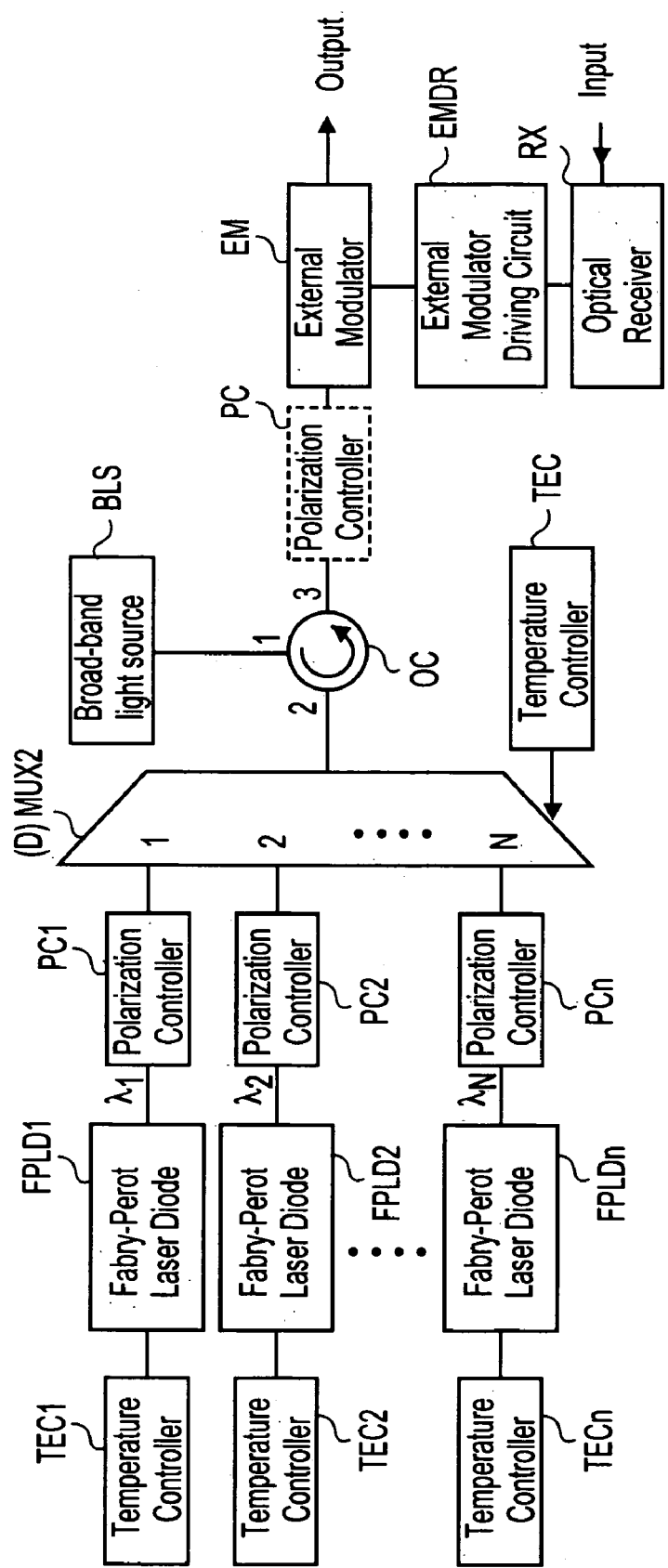
FIG. 11 is the fifth embodiment of a wavelength-division multiplexed transmission system using a light source in accordance with the present invention.

FIG. 10 is the fourth embodiment of a wavelength-division multiplexed transmission system using a light source in accordance with the present invention.

As described in FIG. 10, a wavelength-division multiplexed transmission system in accordance with the present invention comprises N Fabry-Perot laser diodes(FPLD1, FPLD2, ..., FPLDn), N laser diode temperature controllers (TEC1, TEC2, ..., TECn), an N×1 (de)multiplexer((D) MUX2), a (de)multiplexer temperature controller(TEC), an optical circulator(OC), an broad-band light source(BLS), an external modulator(EM), and an external modulator driving circuit(EMDR).

A (de)multiplexer((D)MUX2) demultiplexes wavelength-division multiplexed optical signals inputted through a common port and outputs them through N input/output ports respectively. Or, it multiplexes the optical signals having different wavelengths, which are inputted through N input/output ports respectively, and outputs them through the common port.

An broad-band light source(BLS) emits a wide-band light.

The optical circulator(OC) outputs the optical signals inputted through the first port through the second port and the optical signals inputted through the second port through the third port.

The connection of a transmission system(100) described above can be performed as follows:

N Fabry-Perot laser diodes(FPLD1, FPLD2, ..., FPLDn) are connected to N ports of a (de)multiplexer((D)MUX2) respectively, and the common port of the (de)multiplexer ((D)MUX2) is connected to the second port of an optical circulator(OC).

The first port of the optical circulator(OC) is connected to an broad-band light source(BLS) and the third port of the optical circulator(OC) is connected to an external modulator (EM).

An external modulator driving circuit(EMDR) is connected to the external modulator(EM), and thus electric signals are inputted into the external modulator driving circuit(EMDR) and modulated optical signals are outputted through the external modulator(EM).

Looking into the operation principle of a transmission system(100), the output of an broad-band light source(BLS) is inputted through the first port of an optical circulator(OC), passing through the second port to be inputted into the common port of a (de)multiplexer((D)MUX2), and then outputted through the corresponding N ports of (de)multiplexer((D)MUX2) respectively.

The outputs from the (de)multiplexer((D)MUX2) are inputted into N Fabry-Perot laser diodes(FPLD1, FPLD2, ..., FPLDn) respectively, and each of the Fabry-Perot laser diodes(FPLD1, FPLD2, ..., FPLDn) outputs optical signals whose wavelengths are within the within the pass-bands of the N ports of a (de)multiplexer((D)MUX2) respectively.

The outputs from N Fabry-Perot laser diodes(FPLD1, FPLD2, ..., FPLDn) are multiplexed by the (de)multiplexer ((D)MUX2), passing through the optical circulator(OC), and then inputted into the external modulator(EM). Then, the external modulator(EM) modulates the inputted optical signals, with using the received electric signals, and outputs the modulated signals.

In a transmission system(100) described above, by controlling the currents applied to the Fabry-Perot laser diodes (FPLD1, FPLD2, ..., and FPLDn), it is possible to control that optical signals with a(or more than 2) specific wavelength(s) are outputted through the external modulator(EM).

A transmission system(100) of the present invention further comprises N polarization controllers(PC1, PC2, ..., PCn) connected between the input/output ports of a (de) multiplexer((D)MUX2) and N Fabry-Perot laser diodes(FPLD1, FPLD2, ..., FPLDn) or a polarization controller(PC) connected between an external modulator(EM) and an optical circulator(OC).

The transmission system(100) further comprises N laser diode temperature controllers(TEC1, TEC2, ..., TECn) for controlling the temperatures of N Fabry-Perot laser diodes (FPLD1, FPLD2, ..., FPLDn) and a temperature controller (TEC) for controlling the temperature of a (de)multiplexer ((D)MUX2).

FIG. 12 shows the fifth embodiment of a wavelength-division multiplexed transmission system using a light source in accordance with the present invention, which further comprises an optical receiver(RX) with the structure of a transmission system described in FIG. 10.

An optical receiver(RX) converts the input optical signals into electric signals.

With comprising an additional optical receiver(RX), when optical signals with a specific wavelength is externally inputted, the system can converts the signal into electric signal, and then converts it back to the optical signal(s) with a(or more than 2) wavelength(s).

Here, the wavelengths of optical signals outputted through an external modulator(EM) can be varied by controlling the currents applied to the Fabry-Perot laser diodes (FPLD1, FPLD2, . . . , FPLDn).

As mentioned thereinbefore, a transmission system using a light source in accordance with the present invention reduces the cost per channel. Moreover, it can increase the output power, and thus it makes it easy to constitute a transmission system and expand the network coverage.

In addition, a wavelength-division multiplexed transmission system in accordance with the present invention is constituted for wavelength-division multiplexed optical signals to be inputted and/or outputted through the same optical fiber, and thus it can reduce the number of fibers required for optical communication to be half of that of the prior art.

Since those having ordinary knowledge and skill in the art of the present invention will recognize additional modifications and applications within the scope thereof, the present invention is not limited to the embodiments and drawings described above.

What is claimed is:

1. A method, comprising:
   outputting a wide-band light that includes a spontaneous emission;
   filtering the wide-band light to generate a first narrow-band light signal that includes the spontaneous emission;
   externally injecting the first narrow-band light signal into a first light source capable of modulation;
   locking an output wavelength emitted by the first light source capable of modulation within the bandwidth of the injected first narrow-band light signal;
   separating the output wavelength emitted by the first light source capable of modulation from the first narrow-band light signal injected into the first light source capable of modulation;
   filtering the wide-band light to generate a second narrow-band light signal that has center wavelength different that the first narrow-band light signal;
   externally injecting the second narrow-band light signal into a second light source capable of modulation;
   locking an output wavelength emitted by the second light source capable of modulation within the bandwidth of the injected second narrow-band light signal; and
   separating the output wavelength emitted by the second light source capable of modulation from the second narrow-band light signal injected into the second light source capable of modulation.

2. The method of claim 1, further comprising:
   controlling an amount bias current supplied to the first light source capable of modulation to control characteristic of the output wavelength emitted by the first light source capable of modulation.

3. The method of claim 1, further comprising:
   controlling an operating temperature of the first light source capable of modulation to control characteristics of the output wavelength emitted by the first light source capable of modulation.

4. The method of claim 1, wherein the filtering of the broadband wavelength of light is adjustable.

5. An apparatus, comprising:
   means for outputting a wide-band light that includes a spontaneous emission;
   means for filtering a broadband wavelength of light to generate a first narrow-band light signal that includes the spontaneous emission;
   means for externally injecting the first narrow-band light signal into a first light source capable of modulation;
   means for locking an output wavelength emitted by the first light source capable of modulation within the bandwidth of the injected first narrow-band light signal;
   means for separating the output wavelength emitted by the first light source capable of modulation from the first narrow-band light signal injected into the first light source capable of modulation;
   means for filtering the wide-band light to generate a second narrow-band light signal that has a center wavelength different than the first narrow-band light signal;
   means for externally injecting the second narrow-band light signal into a second light source capable of modulation;
   means for locking an output wavelength emitted by the second light source capable of modulation within the bandwidth of the injected second narrow-band light signal; and
   means for separating the output wavelength emitted by the second light source capable of modulation from the second narrow-band light signal injected into the second light source capable of modulation.

6. The apparatus of claim 5, further comprising:
   means for controlling an amount bias current supplied to the first light source capable of modulation to control characteristics of the output wavelength emitted by the first light source capable of modulation.

7. The apparatus of claim 5, further comprising:
   means for controlling an operating temperature of the first light source capable of modulation to control characteristics of the output wavelength emitted by the first light source capable of modulation.

8. The method of claim 5, wherein the means for filtering is adjustable.

9. The method of claim 5, further comprising means for externally modulating the light emitted by the first light source and the second light source.

10. An apparatus, comprising:
    a light source capable of modulation having a laser chip with two or more cavity modes, wherein the light source capable of modulation to receive a spectral slice of a light signal from a broadband light source to wavelength lock an output wavelength of the light source capable of modulation within the bandwidth of the injected light signal; and
    wherein the bandwidth of the injected light signal and a physical length of the laser chip are matched to approximately cause wavelengths in the bandwidth of the injected light signal to overlap with one or more cavity modes of the light source capable of modulation independent of an ambient environment shifting the cavity modes of the light source capable of modulation.

11. The apparatus of claim 10, wherein the light source capable of modulation is a Fabry-Perot laser diode.

12. The apparatus of claim 11, wherein the physical length of the laser chip has a chip length of greater than 350 microns.

13. The apparatus of claim 11, wherein the physical length of the laser chip has a chip length of approximately 400 microns and the cavity mode spacing is approximately 100 Gigahertz.

14. The apparatus of claim 10, wherein the generated output wavelength of the light source capable of modulation is unpolarized.

15. The apparatus of claim 10, further comprising:
a filter coupled to the light source capable of modulation, wherein the filter transmits the spectral slice of the light signal to the light source capable of modulation and the bandwidth of the spectral slice is sized in relation to the mode spacing of the light source capable of modulation.

16. The apparatus of claim 10, wherein the light source capable of modulation is configured to operate to suppress an intensity noise of the spectral slice from the broadband light source.

17. The apparatus of claim 10, further comprising:
an external modulator having an input port and an output port for optical signals, wherein the external modulator to modulate the generated output wavelength of the light source capable of modulation inputted through the input port according to electrical signals applied thereto and to pass the modulated signals through the output port, and an external modulator driving device to provide the electrical signals for operating the external modulator.

* * * * *